United States Patent
Gessner et al.

(10) Patent No.: US 8,652,341 B2
(45) Date of Patent: Feb. 18, 2014

(54) METHOD AND APPARATUS FOR STRUCTURING COMPONENTS MADE OF A MATERIAL COMPOSED OF SILICON OXIDE

(75) Inventors: Thomas Gessner, Chemnitz (DE); Andreas Bertz, Chemnitz (DE); Reinhard Schubert, Chemnitz (DE); Thomas Werner, Oederan (DE); Wolfgang Hentsch, Radebeul (DE); Reinhard Fendler, Moritzburg (DE); Lutz Koehler, Radebeul (DE)

(73) Assignee: FHR Anlagenbau GmbH, Ottendorf-Okrilla (DE)

( * ) Notice: Subject to any disclaimer, the term of this patent is extended or adjusted under 35 U.S.C. 154(b) by 420 days.

(21) Appl. No.: 12/433,128

(22) Filed: Apr. 30, 2009

(65) Prior Publication Data

US 2009/0236311 A1    Sep. 24, 2009

Related U.S. Application Data

(63) Continuation of application No. PCT/DE2007/001954, filed on Oct. 30, 2007.

(30) Foreign Application Priority Data

Oct. 30, 2006   (DE) .......................... 10 2006 051 550

(51) Int. Cl.
  *C23F 1/00*    (2006.01)
  *C23F 1/08*    (2006.01)
(52) U.S. Cl.
  USPC .......................................................... 216/67
(58) Field of Classification Search
  None
  See application file for complete search history.

(56) References Cited

U.S. PATENT DOCUMENTS

| | | | | |
|---|---|---|---|---|
| 4,370,556 A | * | 1/1983 | Stengl et al. | 250/503.1 |
| 5,013,400 A | * | 5/1991 | Kurasaki et al. | 438/713 |
| 5,310,454 A | * | 5/1994 | Ohiwa et al. | 438/723 |
| 5,468,342 A | * | 11/1995 | Nulty et al. | 438/714 |
| 5,503,901 A | * | 4/1996 | Sakai et al. | 438/723 |
| 5,562,801 A | * | 10/1996 | Nulty | 438/695 |
| 5,605,600 A | * | 2/1997 | Muller et al. | 438/695 |
| 5,627,081 A | * | 5/1997 | Tsuo et al. | 438/57 |
| 5,753,566 A | | 5/1998 | Hwang | |

(Continued)

FOREIGN PATENT DOCUMENTS

| DE | 2 224 468 | 1/1973 |
|---|---|---|
| EP | 0 984 328 A2 | 3/2000 |

(Continued)

OTHER PUBLICATIONS

German Office Action dated Jul. 3, 2007 (Three (3) pages).

(Continued)

*Primary Examiner* — Allan Olsen
(74) *Attorney, Agent, or Firm* — Crowell & Moring LLP

(57) ABSTRACT

A method and an apparatus for forming a structure on a component made of a material composed of silicon oxide, especially of silicate glass, glass ceramic or quartz, wherein in accordance with the process at least a first surface of the component a partial removal of the material by plasma etching takes place and during the plasma etching at least at the surface to be etched a substrate temperature is established which is substantially greater than 90° C. but less than the softening temperature of the material. The apparatus is equipped for this purpose with a heater for generating the substrate temperature.

10 Claims, 4 Drawing Sheets

(56) References Cited

U.S. PATENT DOCUMENTS

| | | | |
|---|---|---|---|
| 5,847,918 A * | 12/1998 | Shufflebotham et al. | 361/234 |
| 5,866,483 A * | 2/1999 | Shiau et al. | 438/720 |
| 5,879,973 A * | 3/1999 | Yanai et al. | 438/161 |
| 5,922,223 A * | 7/1999 | Okumura et al. | 219/121.43 |
| 6,048,798 A * | 4/2000 | Gadgil et al. | 438/714 |
| 6,051,153 A * | 4/2000 | Liao | 216/79 |
| 6,069,077 A * | 5/2000 | Lee et al. | 438/675 |
| 6,096,160 A * | 8/2000 | Kadomura | 156/345.49 |
| 6,111,260 A * | 8/2000 | Dawson et al. | 250/492.21 |
| 6,120,661 A | 9/2000 | Hirano et al. | |
| 6,189,482 B1 * | 2/2001 | Zhao et al. | 118/723 R |
| 6,274,505 B1 * | 8/2001 | Ito et al. | 438/745 |
| 6,338,990 B1 * | 1/2002 | Yanai et al. | 438/160 |
| 6,368,519 B1 * | 4/2002 | Katakura et al. | 216/72 |
| 6,461,533 B1 * | 10/2002 | Horiike et al. | 252/79.1 |
| 6,511,608 B1 * | 1/2003 | Mori et al. | 216/67 |
| 6,534,809 B2 * | 3/2003 | Moise et al. | 257/295 |
| 6,736,147 B2 * | 5/2004 | Satoh et al. | 134/1.1 |
| 6,774,032 B1 * | 8/2004 | Park | 438/640 |
| 6,927,173 B2 * | 8/2005 | Mori et al. | 438/710 |
| 7,560,007 B2 * | 7/2009 | Gaff | 156/345.27 |
| 7,746,529 B2 * | 6/2010 | Hagood et al. | 359/233 |
| 7,902,078 B2 * | 3/2011 | Nakaya | 438/710 |
| 8,140,292 B2 * | 3/2012 | Wendt | 702/124 |
| 2001/0008229 A1 * | 7/2001 | Selitser | 219/121.52 |
| 2001/0019897 A1 * | 9/2001 | Kumar et al. | 438/724 |
| 2002/0004309 A1 * | 1/2002 | Collins et al. | 438/719 |
| 2002/0104821 A1 * | 8/2002 | Bazylenko et al. | 216/24 |
| 2003/0051665 A1 * | 3/2003 | Zhao et al. | 118/723 E |
| 2003/0092280 A1 * | 5/2003 | Lee et al. | 438/720 |
| 2003/0162373 A1 * | 8/2003 | Goto et al. | 438/485 |
| 2003/0186545 A1 * | 10/2003 | Kamp et al. | 438/689 |
| 2004/0009662 A1 * | 1/2004 | Park et al. | 438/640 |
| 2004/0171196 A1 * | 9/2004 | Walitzki | 438/137 |
| 2004/0259384 A1 * | 12/2004 | Nag et al. | 438/788 |
| 2005/0142886 A1 * | 6/2005 | Lee et al. | 438/710 |
| 2006/0065621 A1 * | 3/2006 | Chen et al. | 216/56 |
| 2006/0216926 A1 * | 9/2006 | Ye et al. | 438/629 |
| 2007/0193602 A1 * | 8/2007 | Savas et al. | 134/1.1 |
| 2007/0197039 A1 * | 8/2007 | Puech | 438/706 |
| 2007/0202701 A1 * | 8/2007 | Nakaya et al. | 438/689 |
| 2008/0283175 A1 * | 11/2008 | Hagood et al. | 156/145 |
| 2009/0029528 A1 * | 1/2009 | Sanchez et al. | 438/476 |
| 2009/0071938 A1 * | 3/2009 | Dhindsa et al. | 216/67 |
| 2009/0114818 A1 * | 5/2009 | Casares et al. | 250/307 |
| 2009/0218314 A1 * | 9/2009 | Davis et al. | 216/60 |
| 2009/0236311 A1 * | 9/2009 | Gessner et al. | 216/49 |
| 2009/0238993 A1 * | 9/2009 | Stowell et al. | 427/553 |
| 2010/0143744 A1 * | 6/2010 | Gupta et al. | 428/601 |
| 2011/0011535 A1 * | 1/2011 | Dhindsa et al. | 156/345.48 |
| 2013/0008870 A1 * | 1/2013 | Nogami et al. | 216/55 |

FOREIGN PATENT DOCUMENTS

| | | |
|---|---|---|
| JP | 2000-164567 A | 6/2000 |
| JP | 2002-284545 A | 10/2002 |
| WO | WO 86/06203 A1 | 10/1986 |

OTHER PUBLICATIONS

International Search Report and Form PTO/ISA/237 dated May 7, 2008 (Nine 9 pages).

* cited by examiner

METHOD AND APPARATUS FOR STRUCTURING COMPONENTS MADE OF A MATERIAL COMPOSED OF SILICON OXIDE

CROSS REFERENCE TO RELATED APPLICATIONS

This application is a continuation of international patent application no. PCT/DE2007/001954, filed Oct. 30, 2007 designating the United States of America and published in German on May 8, 2008 as WO 2008/052528, the entire disclosure of which is incorporated herein by reference. Priority is claimed based on Federal Republic of Germany patent application no. DE 10 2006 051 550.1, filed Oct. 30, 2006.

BACKGROUND OF THE INVENTION

The invention relates to a method and a apparatus for structuring components using a material based on silicon oxide, in particular silicate glass, glass ceramic, or quartz.

Silicon and glass wafers are among the materials used most frequently in microtechnology. Glass is increasingly gaining in significance for various MEMS applications (micro-electromechanical systems). In addition to the classical use as a composite partner for capping sensitive sensors, this also relates above all to microfluidic applications for bioanalysis. However, the necessity results from this of structuring the various silicate glasses of differing compositions. Depending on the application, greatly varying structures are necessary in the glass: holes having a high aspect ratio or defined bevels for through contacting, trenches for channel and diaphragm production, or also special shapes for high-frequency components.

While both high-precision and also efficient plasma etching methods (high-speed etching) exist for silicon structuring, the structuring of glass in large etching depths (greater than 10 μm) using plasma technology has only been possible very poorly in comparison up to this point. Thus, for example, until now technologies based on lasers, ultrasound, sandblasting, wet etching processes, or also sawing have still been preferred. Plasma etching methods have only allowed practical etching rates significantly less than 1 μm/minute until now. (X. H. Li, T. Abe, and M. Esashi, "Deep reactive ion etching of Pyrex glass," in *Proc. 13th IEEE MEMS 2000 Technical Digest*, volume 1/23-27/00, Miyazaki, Japan, 2000, pages 271-276; J. H. Park et al., "Deep dry etching of borosilicate glass using SF6/Ar . . . ", *Microelectronic Engineering* 82 (2005) 119-128) and a very restricted controllability of the etching profile. Thus, flattening of angles of slope (for example, to approximately 70°) has only been achieved using specially tailored mask geometry. Complex mask technology is also necessary in the existing processes. Thus, reaching etching gaps of 50 μm, for example, requires a stable nickel mask of 4 μm, (X. H. Li, T. Abe, and M. Esashi, "Deep reactive ion etching of Pyrex glass using SF6 plasma," *Sensors and Actuators* A 87 (2001) 139-145) or 9 μm (J. H. Park et al., "Deep dry etching of borosilicate glass using SF6/Ar . . . ", *Microelectronic Engineering* 82 (2005) 119-128). The production of such nickel masks using electrochemical methods is connected to additional outlay, because special intermediate layers are necessary for this purpose, which must also be structured. In addition, it is known from the above-mentioned publication that nickel results in a significant increase in mechanical stress.

Possibilities for increasing the etching rate have only been seen up to this point (X. H. Li, T. Abe, and M. Esashi, "Deep reactive ion etching of Pyrex glass using SF6 plasma," *Sensors and Actuators* A 87 (2001) 139-145) by the use of a high ion acceleration voltage (proportional to the so-called electrical bias voltage) and a low operating pressure. The ion bombardment increased by the two parameters acts to increase the etching rate especially because the typically used glasses normally also contain $Al_2O_3$ and $Na_2O$ components, which do not form volatile reaction products in connection with the fluorine-based plasmas used. A slight increase of the etching rate is observed with the temperature (however, the temperature is negligible according to the statements of the authors) at 0.8 Pa, but its maximum still lies below the etching rate at low pressure (0.2 Pa). Therefore, according to the statements of the authors, the physically determined sputter etching clearly dominates. This is also the basis for all other known processes for plasma etching of glass substrates.

In U.S. Pat. No. 6,120,661 an apparatus is described for treating glass substrates by etching, CVC or sputtering. The processing conditions are not listed in detail and no structure forming treatment is disclosed.

In JP 2000 164567 A a plasma etching process is described in which only a mask of e.g. silicon oxide is utilized and which is used for etching a ferromagnetic thin film. It is a general prerequisite of an etching process that the mask material may not be attacked. The formation of structured components of silicon oxide cannot be derived from this publication.

U.S. Pat. No. 5,753,566 discloses a process and an apparatus, with which a glass layer is etched at slightly elevated temperature (70-110° C.). However, this document is not concerned with the formation of a structure on a component, but instead with etching away the complete surface (etch back) of a spin-on glass layer. This procedure is not in any event suitable for forming a structure on a component, i.e., for partial removal of a material composed of silicon oxide, especially of silicate glass, glass ceramic or quartz.

SUMMARY OF THE INVENTION

It is the object of the invention to provide a method and a apparatus for structuring components composed of silicon oxide, in particular of silicate glass, glass ceramic, or quartz, which enable etching to be performed at high speed and simultaneously ensure good selectivity to the mask material and great variability in the etching profile.

This and other objects are achieved in accordance with the present invention by the method and apparatus described and claimed hereinafter.

According to the invention, in the method for structuring components made of a material composed of silicon oxide, in particular silicate glass, glass ceramic, or quartz, a partial removal of the material is carried out on at least a first surface of the component by plasma etching, a substrate temperature, which is substantially greater than 90° C., but less than the softening temperature of the material, being established at least at the surface to be etched during the plasma etching. A surprisingly high etching rate may be achieved by this high substrate temperature.

The method is preferably carried out using at least one energy source in a fluorine-containing gas mixture, a mask being applied to the surface of the material which exposes the areas of the material to be removed or ablated.

Either a plasma having the capability of changing the ion energy is generated using a first energy source in the form of a high-frequency or low-frequency plasma source and/or a high-density plasma (HDP) is generated using a second energy source. A very broad processing spectrum of components composed of silicon oxide is possible through the selection and/or combination of the energy sources for generating the plasma.

The substrate temperature of the component to be processed is preferably 100° C. to 700° C. However, experiments have shown that the best results are achievable at a substrate temperature between 300° C. and 500° C.

Furthermore, it is possible to carry out the plasma etching using consistent ion energy. Additional advantages are offered by changing ion energy, however, with high ion energies alternating with reduced ion energies during the plasma etching. In the event of a decrease of the glass etching rate with the etching time, which is caused by the formation of nonvolatile reaction products, the ion energy is briefly increased and subsequently reduced again. This is preferably performed alternately, the ion energy being changed every 30 seconds to 90 seconds. The non-volatile reaction products are discharged or removed from the etching base by the increased ion energy and the sputtering process thus caused, whereupon the ion energy may be reduced again and the etching procedure may be continued using reduced ion energy and a high etching rate which is possible again (because of the removed nonvolatile reaction products).

The etching profile to be produced is advantageously adjustable as a function of ion energy and/or ion density and/or the composition of the gas mixture and/or substrate temperature.

For example, the etching profile may be influenced by the ratio of ion energy, ion density, and passivation gases, on the one hand, to the substrate temperature, on the other hand. The etching profile may be influenced, inter alia, as follows:
- by increasing ion density—increasing steepness of the etching slope,
- by increasing fluorine content in the gas mixture—decreasing steepness of the etching slope,
- with increasing temperature—decreasing steepness of the etching slope.

The mask which is applied to the surface of the material to be etched before the etching process preferably comprises a resistant metal (e.g., chromium, nickel, aluminum, or their alloys) or a temperature-resistant organic material (e.g., polymides or epoxide resin).

The plasma etching is preferably performed at a processing pressure of 1 to 40 Pa and a bias voltage up to 300 V, whereby it has been found that the etching rates increase with rising substrate temperature.

It is also possible to perform structuring of the component on a second surface opposite to the first surface. This may also be performed by plasma etching, but laser processing or mechanical processing such as polishing, sandblasting, or grinding is also possible. The structuring and/or thinning of the second surface may be performed by its processing. Complex structures may thus be generated. Furthermore, it is possible that the material composed of silicon oxide which is to be structured is applied to a substrate, which preferably comprises silicon, and it is used for structuring wafers. In this way silicon oxide-silicon-wafer composites can be effectively produced.

The apparatus according to the invention for structuring components made of a material composed of silicon oxide, in particular silicate glass, glass ceramic, or quartz, a partial ablation of the material being performed on at least a first surface of the component by plasma etching, is equipped with a heater for generating a substrate temperature (component temperature) greater than 90° C., but less than the softening temperature of the component material.

Furthermore, the apparatus comprises at least one energy source for generating the plasma, and a fluorine-containing gas mixture. The surface of the material is coated using a mask which leaves the areas of the material to be ablated exposed.

Advantageously, a first energy source is integrated in the apparatus in the form of a high-frequency or low-frequency plasma source for generating a plasma, having the capability of setting/changing the ion energy (before or during the etching) and/or a second energy source is integrated for generating a high-density plasma (HDP).

A substrate temperature of 100° C. to 700° C., preferably between 300° C. and 500° C., is generated using the heater at least on the substrate surface to be processed.

The apparatus comprises in essence a vacuum chamber for plasma etching, in which an atmosphere containing fluorine prevails and in which a receptacle for the component is situated, the receptacle preferably being a substrate carrier or chuck for receiving a wafer. The heater is either coupled to the receptacle or situated above the receptacle and is constructed as a radiant heater. The first energy source is coupled to the substrate carrier, and the second energy source is located above the substrate carrier in connection with a coil configuration. In addition to the use of a coil configuration for the second energy source for generating the high-density plasma, a microwave source may also be used as the second energy source.

The excitation frequency of the first energy source is preferably between 10 kHz and 27 MHz, and the excitation frequency of the second energy source is preferably greater than 2 MHz.

The surprisingly high etching rate of the method and apparatus according to the invention is apparently achieved in that the glass has high temperatures at least on the surface to be etched. It has thus been found that in spite of the admixtures of $Al_2O_3$ and $Na_2O$ in a silicate glass, even at a comparatively high processing pressure (of 35 Pa) and low bias voltage (22 V), etching rates of up to 4 gm/minute are possible, if the glass temperature is sufficiently high (e.g., 400° C.). Electrical power which is comparable to the prior art is coupled into the plasma sources (inductively coupled plasma - ICP). This may only be understood by the presence of a surprisingly dominant chemical effect. Thus, for example, an activation energy of 13.2 kJ/mole may also be ascertained for the etching of PYREX glass based on the temperature dependence of the glass etching rate.

BRIEF DESCRIPTION OF THE DRAWINGS

The invention is explained in greater detail hereinafter based on illustrative embodiments shown in the accompanying drawing figures, in which.

DETAILED DESCRIPTION OF PREFERRED EMBODIMENTS

Figure 1:
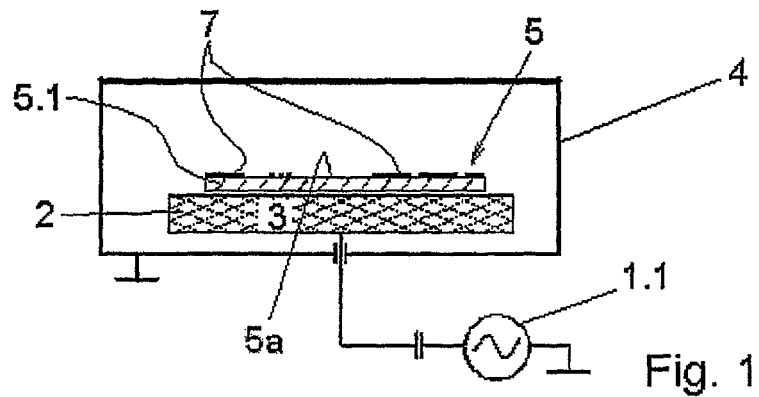
FIG. 1: shows a schematic illustration of a plasma etching chamber employing a first energy source in the form of a high-frequency plasma source for generating a plasma and setting the ion energy, which is coupled to the substrate carrier.

FIG. 1 shows a schematic illustration of an apparatus according to the invention employing a first energy source 1.1 in the form of a high-frequency plasma source for generating a plasma with the capability of changing the ion energy, which is coupled to a receptacle in the form of a substrate carrier 2. The substrate carrier 2 is heatable using a heater 3, situated on the substrate carrier 2, in order to achieve the required substrate temperature. The first energy source 1.1 and the heatable substrate carrier 2 are situated here in the vacuum chamber 4 (or near the vacuum chamber according to one illustrative embodiment which is not shown), in which a suitable gas atmosphere of a fluorine gas mixture prevails during the plasma etching. The desired partial vacuum is retained in the vacuum chamber 4 using a pump system (not shown). The first energy source 1.1 for electrical plasma generation, which is also used for generating the bias voltage (which influences the ion energy), is absolutely necessary.

The component 5 to be etched, which comprises the glass substrate 5.1, for example, and is provided on its first surface 5a to be etched with a mask 7, is accommodated according to FIG. 1 by the substrate carrier 2, which generates the required substrate temperature by its heater 3 and which may be responsible for the implementation of defined potential ratios.

Figure 1A:
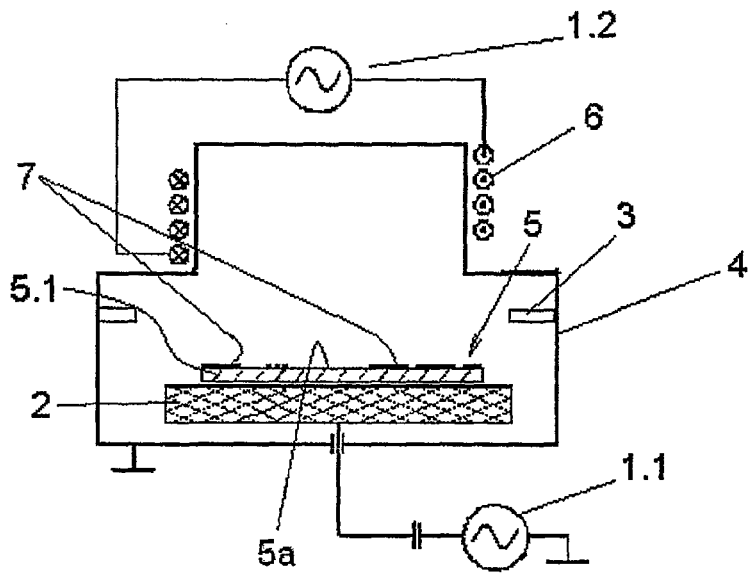
FIG. 1a: shows a schematic illustration of a plasma etching chamber according to FIG. 1, with a second energy source for additionally generating a high-density plasma (HDP)

According to FIG. 1a, in addition to the first energy source 1.1, which is coupled to the substrate carrier 2, a second energy source 1.2 controllable independently therefrom is used. The second (upper) energy source 1.2 is responsible for the degree of dissociation of the gas located in the vacuum chamber 4, by which a high-density plasma (HDP) may be generated using the second energy source 1.2.

The energy of the upper second energy source 1.2 may be coupled in inductively using a coil system 6, as shown in FIG. 1a, but also using other configurations (not shown) (ECR, microwave, with magnetic field support, VHF, etc.). A high-density plasma (HDP) is thus advantageously generated. The component 5 to be etched (e.g. glass substrate 5.1) is also located, according to FIG. 1a, on a suitable substrate carrier 2, which is not provided with a heater here, however. The elevated surface temperature required according to the invention for the high-speed etching of glass is achieved here using a heater 3 in the form of a radiant heater, which is situated above the component 5 in the vacuum chamber 4. In accordance with one illustrative embodiment (not shown), the heater may also be integrated in the substrate carrier.

Figure 2:
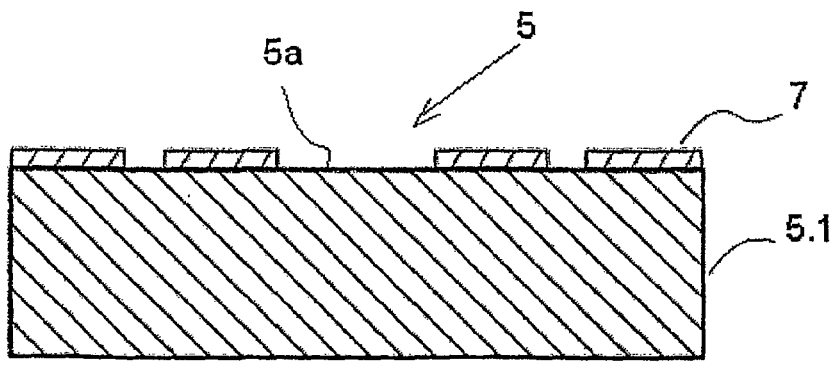
FIG. 2: shows a cross-section of a component made of a glass substrate, which is provided with a structured masking layer.

FIG. 2 shows a component 5 made of a glass substrate in cross-section, which is covered using a structured masking layer/mask 7 on its first surface 5a. Various metals and also temperature resistant organic materials (such as polymides and epoxide resins) have proven to be suitable as the material for the mask 7. For example, a thin aluminum layer is advantageous, which may particularly be 100 nm up to multiple μm—e.g., 1 μm for an etching depth up to 50 μm—depending on the desired etching depth. This layer may be structured easily by wet chemistry or also using plasma etching methods.

Figure 3:
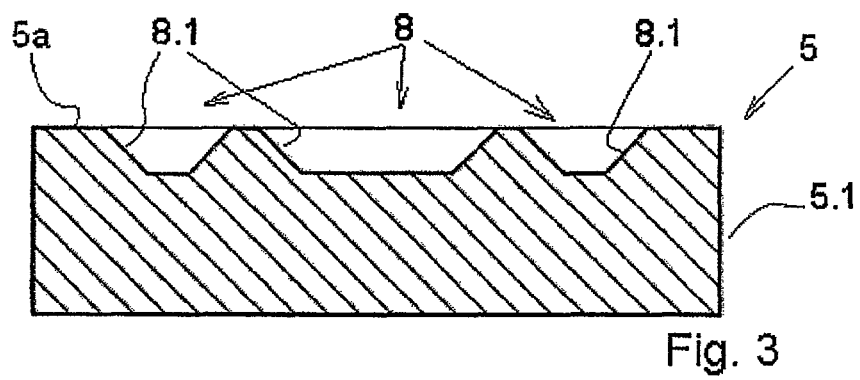
FIG. 3: shows a cross-section of a component made of a glass substrate after the etching and the removal of the mask having a flat etching slope.
Figure 4:
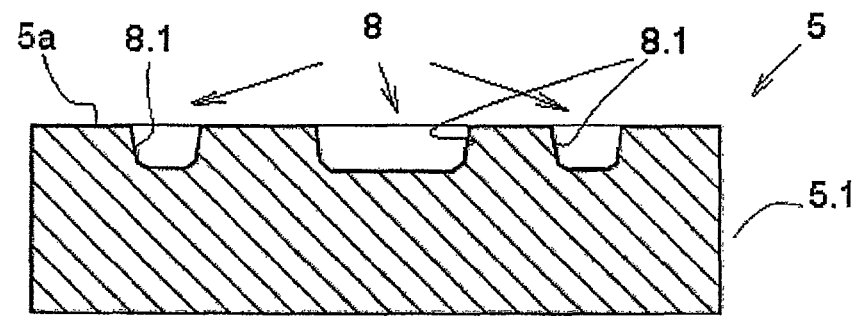
FIG. 4: shows a cross-section of a component made of a glass substrate after the etching and the removal of the mask having a nearly perpendicular etching slope.
Figure 5:
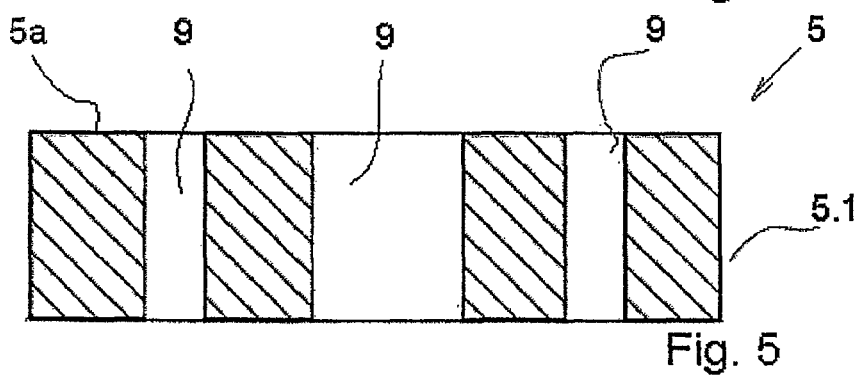
FIG. 5: shows a cross-section of a component made of a glass substrate after the etching and the removal of the mask having through holes.

The following FIGS. 3, 4, and 5 show components 5 comprising the glass substrate 5.1 in the form of borosilicate glass in cross-section, which have been structured using different parameters corresponding to the method according to the invention from the direction of the first surface 5a, after the removal of the mask material/the mask. Thus, an etching profile 8 having a flat etching slope 8.1 is obtained according to FIG. 3 from the direction of the first surface 5a in the component 5 (glass substrate 5.1), if a substrate temperature of 400° C., SF6 and CF4 as the etching gas mixture, an operating pressure of 35 Pa, a power of 40 W coupled in from the first energy source 1.1 (plasma source), and a power of 1000 W coupled in at the second energy source 1.2 (plasma source for generating the high-density plasma) are used.

The etching rate of borosilicate glass(BOROFLOAT) achieved in this case is above all values achievable up to this point, at approximately 3700 nm/minutes. The etching profile 8 thus achieved, which has a relatively flat etching slope 8.1, may be advantageous for later use, for example, if perpendicular etching flanks interfere with subsequent processes.

However, it has been shown when etching in great depths (e.g., 100 μm), that the etching rate gradually decreases due to the accumulation of nonvolatile reaction products on the etching base. In order to counteract this, it is possible to perform the etching process using changing ion energies. For this purpose, for example, changed parameters are set alternately every minute. In this time, an operating pressure of 1 Pa and a power of 300 W coupled in using the first energy source 1.1 (first plasma source) are used. A cleaning effect (sputtering) occurs on the etching base of the etching profile 8 due to this intermediate process having significantly increased ion energy, by which the nonvolatile reaction products may be removed. These are known to accumulate, partially also on the structure side walls, where they may have a passivation effect.

If the ratio of the isotropic to anisotropic etching phases is shifted back in the direction toward an anisotropic etching process, in that the etching times for both etching phases is one minute, for example, an etching profile 8 having a nearly perpendicular etching slope 8.1 is achieved, as shown in FIG. 4. If a sufficiently stable mass 7 is used, such as 6 μm aluminum, through holes 9, corresponding to FIG. 5, may also be etched in the 200 μm thick glass substrate 5.1 of the component 5, for example. It is then advantageous if anisotropic etching profiles are achieved as much as possible by optimally controlled ion energy in connection with an additional side wall passivation to reduce the area consumption. This is performed with special parameters by adding further suitable gases. This effect is detectable, for example, with an admixture of gases having a high carbon component, such as $CH_4$, but is not bound thereto.

Figure 6:
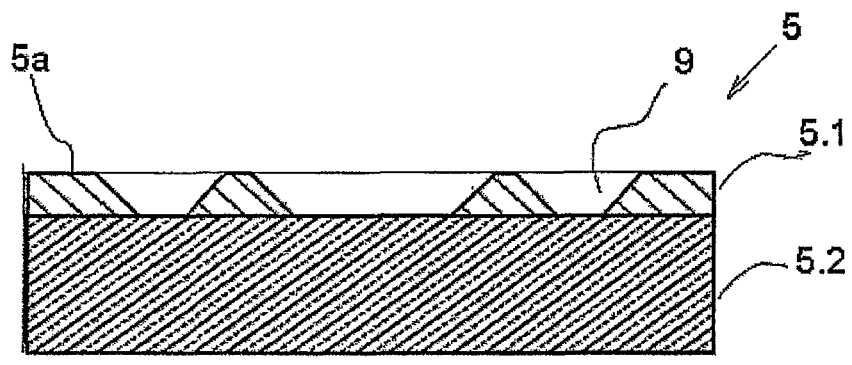
FIG. 6: shows a component made of a silicon wafer having a bonded-on and structured glass substrate.
Figure 7:
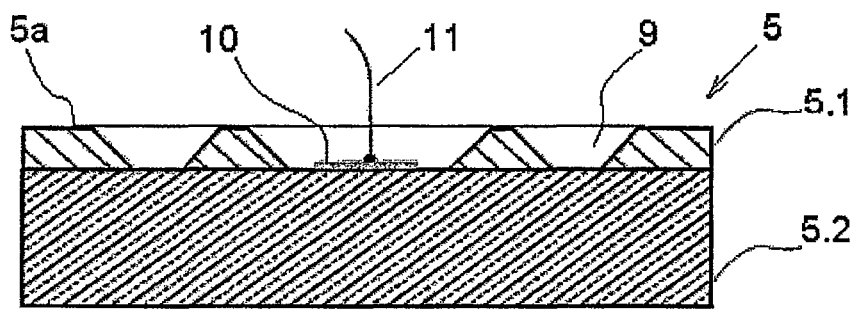
FIG. 7: shows a component made of a silicon wafer having a bonded-on and structured glass substrate, through which a contact is made to a metallization layer applied to the silicon wafer.
Figure 8:
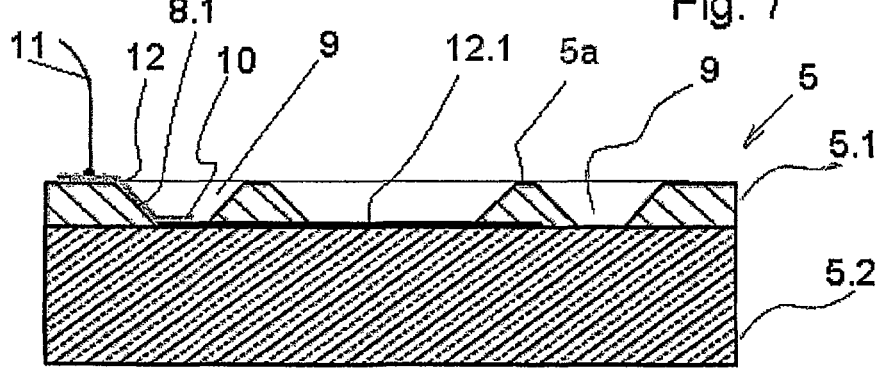
FIG. 8: shows inclined etching flanks etched into the component comprising a glass substrate, through which the metallization may be performed using a sputtering process.

A further illustrative embodiment is shown in FIG. 6, in which the component 5 comprises the glass substrate 5.1, which has been bonded on a silicon wafer 5.2 and structured from the direction of its first surface 5a using through holes 9. This is of interest, for example, if specific terminals must be contacted from above on the silicon wafer 5.2 covered by a glass substrate 5.1. Such a configuration is shown in FIG. 7. The case is shown here in which sufficient space is available for a relatively large opening in the glass substrate 5.1. It is then possible to reach the electrical terminal 10 present on the silicon wafer 5.2 outward through the glass substrate 5.1 (through just these large openings/through holes 9) using wire bonding 11. For the case in which the openings cannot be made sufficiently large or metallic contact surfaces on the top side 5a of the glass substrate 5.1 are required for other contacting methods (bumping), the electrical terminal 10 may be drawn onto the surface of the glass substrate 5.1 using a first metal layer 12. As schematically shown in FIG. 8, the first metal layer 12 may advantageously be applied using a cost-effective sputtering process through the flat etching flanks 8.1 of the through hole 9 etched in the glass substrate 5.1 using the method according to the invention. A second metal layer 12.1 may also be situated between the glass substrate 5.1 and the silicon wafer 5.2, which has the contact/the terminal 10, to which the first metal layer 12 leads.

Figure 9:
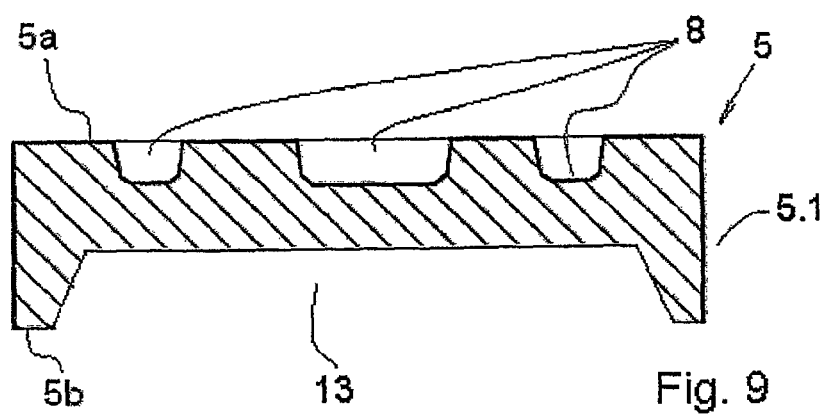
FIG. 9: shows a component made of a glass substrate, whose top side was structured by plasma etching and whose bottom side was partially thinned by mechanical structuring.

A component 5 made of the glass substrate 5.1, whose first surface 5a was provided with an etching profile 8 by plasma etching and whose opposing second surface 5b was partially thinned by a mechanical structuring using a profile 13, is shown in FIG. 9.

Figure 10:
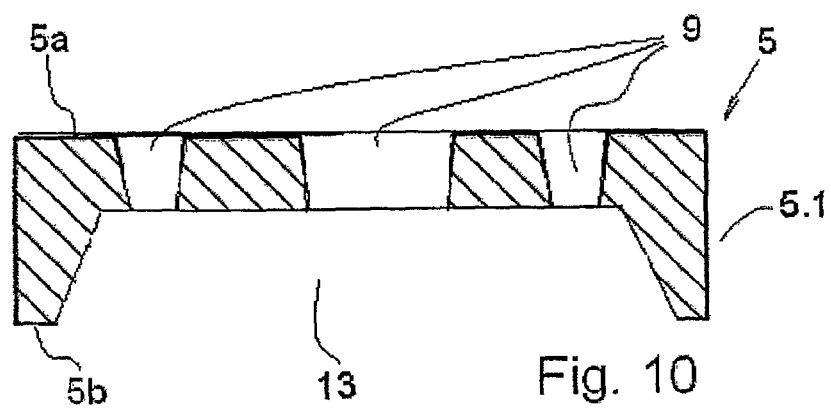
FIG. 10: shows a component made of a glass substrate, whose top side was structured by plasma etching and whose bottom side was partially thinned by mechanical structuring, by which through holes were generated in the glass substrate.

FIG. 10 shows a similar embodiment variant, but the glass substrate 5.1 was thinned from its bottom side (second surface 5b) enough by mechanical structuring using a profile 13 that through holes 9 were formed in the glass substrate 5.1 of the component 5.

Using the method and apparatus according to the invention, it is possible for the first time to structure components composed of silicon oxide, in particular silicate glass, glass ceramic, or quartz, at high etching speeds by plasma etching. Greatly varying types of glass such as silicate glasses or glass ceramics, for example, may be structured and components may be produced and/or processed on this basis.

For the first time, electronic/microelectronic components in the form of structured silicon-glass-wafer composites may be effectively produced by the combination with wafers made of silicon. It is also possible to structure glass ceramics from manifold other technical applications and thus introduce inscriptions or logos, for example.

The foregoing description and examples have been set forth merely to illustrate the invention and are not intended to be limiting. Since modifications of the describe embodiments incorporating the spirit and substance of the invention may occur to persons skilled in the art, the invention should be construed broadly to include all variations within the scope of the appended claims and equivalents thereof.

The invention claimed is:

1. A method for structuring a component made of a material selected from the group consisting of silicate glass or glass ceramic and composed of silicon oxide, said method comprising partially ablating said material on at least one surface of the component by plasma etching utilizing at least one energy source,
wherein a substrate temperature, which is between 300° C. and 700° C., is established at least at the surface to be etched during the plasma etching, and
wherein during the plasma etching high ion energies alternate with reduced ion energies.

2. The method as claimed in claim 1, wherein said method is carried out using at least one energy source in a fluorine-containing gas mixture, and a mask, which leaves exposed areas of the material of the component to be ablated, is applied to the at least one surface of the component.

3. The method as claimed in claim 1, wherein:
a plasma with the a variable ion energy is generated using a first energy source in the form of a high frequency or low-frequency plasma source, or
a high-density plasma is generated using a second energy source, or
a plasma with the a variable ion energy is generated using a first energy source, and a high-density plasma is generated using a second energy source.

4. The method as claimed in claim 1, wherein if the glass etching rate decreases due to formation of nonvolatile reaction products, the ion energy is briefly increased until the nonvolatile reaction products are removed and then is subsequently decreased again.

5. The method as claimed in claim 1, wherein the ion energy is changed alternately each 30 seconds to 90 seconds.

6. The method as claimed in claim 1, wherein an etching profile to be produced is controlled as a function of at least one parameter selected from the group consisting of ion energy, ion density, the composition of the gas mixture and substrate temperature, with the etching profile being determined by the ratio of ion energy, ion density, and gas composition to the substrate temperature.

7. The method as claimed in claim 6, wherein the ion density is increased to increase the steepness of an etching slope of the etching profile.

8. The method as claimed in claim 1, wherein the plasma etching is performed at a processing pressure of 1 to 40 Pa and a bias voltage up to 300 V.

9. A method for structuring a component made of a material composed of silicon oxide, said method comprising partially ablating said material on at least one surface of the component by plasma etching utilizing at least one energy source,
wherein a substrate temperature, which is greater than 130° C. but less than the softening temperature of the material, is established at least at the surface to be etched during the plasma etching;
wherein during the plasma etching high ion energies alternate with reduced ion energies, and
wherein the fluorine content in the gas mixture or the substrate temperature, or both are increases to decrease the steepness of the etching slope.

10. The method as claimed in claim 9, wherein before the etching a mask made of a resistant metal selected from the group consisting of chromium, nickel, aluminum and their alloys or of a temperature-resistant organic material selected from the group consisting of polyamides and epoxide resins, is applied to the at least one surface of the material of the component to be etched.

* * * * *